United States Patent [19]

Bodurow

[11] Patent Number: 4,950,629

[45] Date of Patent: Aug. 21, 1990

[54] PROCESS FOR CATALYST RECOVERY

[75] Inventor: Christina C. Bodurow, Indianapolis, Ind.

[73] Assignee: Eli Lilly and Company, Indianapolis, Ind.

[21] Appl. No.: 290,725

[22] Filed: Dec. 27, 1988

[51] Int. Cl.$^5$ .............................................. B01J 38/68
[52] U.S. Cl. ........................................ 502/24; 502/28
[58] Field of Search ..................................... 502/24, 28

[56] References Cited

U.S. PATENT DOCUMENTS 4,578,368 3/1986 Zoeller .................................. 502/28
4,659,682 4/1987 Pugach .................................. 502/24

FOREIGN PATENT DOCUMENTS 186409 7/1986 European Pat. Off. .

Primary Examiner—Patrick P. Garvin
Attorney, Agent, or Firm—Douglas J. Taylor; Leroy Whitaker

[57] ABSTRACT

The present invention provides a process for recovering homogeneous metallic catalysts from catalytic reaction mixtures, in active form, suitable for immediate re-use. The process comprises removing the reaction solution solvent, adding a lower alkanoic acid, and recovering the precipitated homogeneous catalyst.

20 Claims, No Drawings

4,950,629

PROCESS FOR CATALYST RECOVERY

BACKGROUND OF THE INVENTION

Homogeneous catalysis is an important step in the synthesis of numerous commercially useful compounds. For example, catalytic reactions are employed to reduce groups such as alkenes, aldehydes and nitriles to alkanes, alcohols and amines, respectively. Such catalytic reactions often use salts and/or complexes of a Group VIII metal, such as rhodium, platinum, palladium or cobalt, as the homogeneous catalyst.

A catalyst is a substance which increases the rate of a chemical reaction without being consumed in the reaction. Since the catalyst is not consumed, it is economically desirable to recover the catalyst for further use. This is especially true for catalysts containing exotic and expensive metals such as rhodium. Furthermore, it is also desirable to recover the catalyst in an active form, substantially ready for immediate re-use, as this eliminates the expense associated with re-activating the catalyst.

An object of the present invention is to provide a process by which homogeneous metallic catalysts may be recovered in active form suitable for immediate re-use. The present process accomplishes such recovery in high yield, while utilizing extremely inexpensive materials. Thus, the present process provides an economically attractive route for recovering homogeneous metallic catalysts from catalytic reaction mixtures once the catalytic reaction has been completed.

SUMMARY OF THE INVENTION

The present invention provides a process for recovering a homogeneous catalyst from a catalytic reaction mixture comprising:
(a) removing the reaction mixture solvent;
(b) adding a lower alkanoic acid; and
(c) recovering the precipitated homogeneous catalyst.

DETAILED DESCRIPTION OF THE INVENTION

The process of the present invention is used to recover homogeneous catalysts from a reaction mixture provided by a catalytic reaction. The catalysts which may be recovered by the present process are metal containing compounds or complexes in which the metal is a Group VIII metal. Particularly preferred metal containing compounds or complexes which may be recovered are those in which the Group VIII metal is selected from the platinum group, preferably rhodium and especially rhodium (II).

The metal-containing compounds and complexes which may be recovered are well known in the art. Examples of such compounds and complexes include the metal $C_2$–$C_{10}$ carboxylates and metal complexes with ligands such as CO; $R_3Z$, $(RO)_3Z$ and $(RO)_2ZR$, where R is a suitable alkyl, aryl, aralkyl or alkaryl group, and Z is P, Sb or As. Metal containing compounds of special interest are the platinum group metal carboxylates, especially the rhodium carboxylates. Of the rhodium carboxylates, the rhodium (II) carboxylates, and especially rhodium (II) octanoate, are particularly suited for recovery by the present process.

Once a homogeneous catalytic reaction is complete, the reaction mixture will generally consist essentially of reaction product, catalyst and reaction solvent. If the reaction product is insoluble in the reaction solvent, the product may be easily separated from the homogeneous catalyst by any standard separation technique, for example filtration, leaving a mixture consisting essentially of catalyst dissolved in reaction solvent. The catalyst may then be recovered using the process of the invention, as described below.

The homogeneous catalyst is recovered from the reaction mixture by removing the reaction solvent, preferably by distillation. As the solvent is removed, a lower alkanoic acid is added to the mixture at a rate such that the reaction solvent/alkanoic acid/catalyst mixture remains homogeneous. The amount of lower alkanoic acid added is not critical. In general, the lower alkanoic acid is added in an amount sufficient to provide a slurry suitable for catalyst isolation once the catalyst precipitates from the homogeneous mixture, i.e., once the reaction solvent has been sufficiently removed. Slurries which are too thick (filter blinding or centrifuge unbalancing) or too thin (excessive filtrate or centrate) due to insufficient or excessive amounts of alkanoic acid, respectively, are generally considered to be the outer limits of a slurry which is suitable for catalyst isolation.

Examples of lower alkanoic acids which may be used in the process of the invention include $C_1$–$C_{10}$ alkanoic acids such as formic acid, acetic acid, propionic acid, n-butyric acid, iso-butyric acid, valeric acid, hexanoic acid, heptanoic acid, octanoic acid, decanoic acid and the like. The specific lower alkanoic acid used is not critical. However, to insure the reaction solvent is preferentially removed relative to the alkanoic acid, the alkanoic acid added as the reaction solvent is removed should have a lower volatility than the solvent being removed. Provided the volatility of the reaction solvent is sufficiently low, formic acid is a preferred alkanoic acid in the present process.

Once the reaction solvent has been sufficiently removed the homogeneous catalyst, being insoluble in the alkanoic acid, will precipitate. The catalyst may then be recovered using standard isolation techniques, for example, centrifugation, filtration and the like. The recovered catalyst is active and may be re-used without any further processing.

Many of the reaction solvent/alkanoic acid exchanges of the present process can be performed at the atmospheric pressure boiling point of the reaction solvent. However, for certain catalysts such atmospheric pressure distillation requires sufficiently elevated temperatures such that decomposition of the metal containing compound or complex can occur. For example, if rhodium (II) octanoate is recovered by a process requiring distillation temperatures of greater than about 60° C. a gummy, oily, black substance is obtained in place of the desired rhodium compound. To minimize decomposition when recovering such temperature sensitive catalysts, the reaction solvent should be removed under reduced pressure in order to reduce the distillation temperature to a temperature safely below the decomposition temperature of the catalyst.

While the above describes recovering a catalyst from a reaction mixture wherein the reaction product is insoluble in the reaction solvent, the present process may also be used in instances where the reaction product remains in solution after the catalytic reaction is complete. In those instances, the process of the invention will employ a reaction mixture containing both homogeneous catalyst and reaction product. If the reaction product is substantially soluble in the alkanoic acid which is added as the reaction solvent is removed the catalyst will selectively precipitate, leaving the product in solution. The catalyst may then be recovered by separating it from the product and the alkanoic acid using any of the standard isolation techniques mentioned previously.

If the reaction product is insoluble in the alkanoic acid it too will precipitate once the reaction solvent has been sufficiently removed. The resulting solids, when isolated, will therefore contain a mixture catalyst and reaction product. The catalyst is separated from the reaction product by adding the catalyst/reaction product mixture to a solvent in which the catalyst is relatively insoluble and the product is relatively soluble. The solids which do not dissolve, consisting essentially of catalyst, are then recovered using standard isolation techniques, for example filtration.

The following Examples further illustrate the process of the present invention. The Examples are not intended to limit the scope of the invention in any respect and should not be so construed.

EXAMPLE 1

Preparation of a Catalytic Reaction Mixture Consisting Essentially of Rhodium (II) Octanoate and Methyl t-Butyl Ether To a suspension of 100.0 g (201.8 mmol) of p-nitrobenzyl cis-A-diazo-B,4-dioxo-3-[(phenoxyacetyl)amino]-2-azetidinepentanoate in 1778.2 ml of methylene chloride were added 0.55 g (0.71 mmol) of rhodium (II) octanoate. The suspension was heated until the liquid began to reflux and then stirred at that temperature for two hours. The methylene chloride was removed by distillation while methyl t-butyl ether (1666.8 ml) was added simultaneously. The resulting solution was slowly cooled to about 5° C. and p-nitrobenzyl 7$\beta$-[(phenoxyacetyl)amino]-3-hydroxy-1-carba(1-dethia)-3-cephem-4-carboxylate crystallized. The crystals were isolated by filtration and washed with 160 ml of methyl t-butyl ether to provide a filter cake consisting essentially of p-nitrobenzyl 7$\beta$-[(phenoxyacetyl)amino]-3-hydroxy-1-carba(1-dethia)-3-cephem-4-carboxylate and a liquor containing rhodium (II) octanoate dissolved in methyl t-butyl ether.

The mother liquor prepared above was combined with mother liquors from similar reactions. When a sufficient quantity of liquid had been collected, the rhodium (II) octanoate was recovered as described in Example 2.

The 1-carbacephem carboxylate recovered above was purified by suspending the filter cake prepared above in 820 ml of a 4.5:1 (v:v) methanol/acetonitrile solvent mixture. The resulting slurry was stirred at room temperature (24° C.) for one hour and then cooled to about 5° C. The solids were recovered by filtration, washed successively with 170 ml of methanol, 170 ml of toluene and 340 ml of hexane, and dried at 40° C. in a vacuum oven to provide 70.7 g (75.0% yield) of p-nitrobenzyl 7$\beta$[(phenoxyacetyl)amino]-3-hydroxy-1-carba(1-dethia)-3-cephem-4-carboxylate.

Example 2

Recovery of Rhodium (II) Octanoate from a Rhodium (II) Octanoate/Methyl t-Butyl Ether Reaction Mixture.

A reaction mixture (1440 liters) containing rhodium (II) octanoate dissolved in methyl t-butyl ether (analysis of an aliquot of the solution disclosed the concentration was 0.748 g of rhodium (II) octanoate/liter of solution; total rhodium (II) octanoate 1077.4 g) was added to a 500 gallon tank equipped with a condenser. The tank's contents were placed under reduced pressure and heated until the methyl t-butyl ether solvent began to distill (temperature =45° C.). After approximately 1400 liters of the ether solvent were removed, 170 liters of a formic acid (98% by weight formic acid, 2% by weight water) solution were added at a rate such that the distilling solution remained homogeneous. Distillation of the ether solvent continued during formic acid addition, and the distillation temperature was maintained at about 45° C.

Distillation was continued until a total of 1440 liters of liquid were removed from the 500 gallon tank. The contents of the tank were cooled to about 0° C. and a solid precipitated. The precipitate was collected by filtration, washed with 50 liters of formic acid, and dried in a vacuum oven at 40° C. to provide 754.19 g of rhodium (II) octanoate (70.0% recovery of rhodium (II) octanoate).

F.D. Mass spec.: 778

| Analysis calculated for $Rh_2C_{32}H_{60}O_8$ | | |
|---|---|---|
| Theory: | C, 49.04; | H, 7.8; |
| Found: | C, 50.98; | H, 8.2. |

Example 3

Establishing that the Recovered Rhodium (II) Octanoate is Active

To show that the rhodium (II) octanoate recovered in Example 2 can be re-used without further processing, the procedure of Example 1 was repeated using 0.55 g of the rhodium (II) octanoate recovered in Example 2. The reaction produced 69.8 g (74.0% yield) of p-nitrobenzyl 7$\beta$%-[(phenoxyacetyl)amino]-3-hydroxy-1carba(1-dethia)-3-cephem-4-carboxylate, which compared favorably with the 75.0% yield achieved in Example 1.

I claim:

1. A process for recovering a homogeneous catalyst from a catalytic reaction mixture comprising:
   (a) removing the reaction mixture solvent using temperatures such that decomposition of the catalyst is minimized;
   (b) simultaneously adding a lower alkanoic acid; and
   (c) recovering the precipitated homogeneous catalyst.

2. A process of claim 1 wherein the catalyst is a metal containing compound or complex in which the metal is a Group VIII metal.

3. A process of claim 2 wherein the Group VIII metal is selected from the platinum group.

4. A process of claim 3 wherein the metal selected from the platinum group is rhodium.

5. A process of claim 4 wherein the rhodium is rhodium (II).

6. A process of claim 2 wherein the metal containing compound is a Group VIII metal $C_2$–$C_{10}$ carboxylate.

7. A process of claim 6 wherein the Group VIII metal $C_2$–$C_{10}$ carboxylate is a platinum group metal $C_2$–$C_{10}$ carboxylate.

8. A process of claim 7 wherein the platinum group metal $C_2$–$C_{10}$ carboxylate is a rhodium $C_2$–$C_{10}$ carboxylate.

9. A process of claim 8 wherein the rhodium $C_2$–$C_{10}$ carboxylate is a rhodium (II) $C_2$–$C_{10}$ carboxylate.

10. A process of claim 9 wherein the rhodium (II) $C_2$–$C_{10}$ carboxylate is rhodium (II) octanoate.

11. A process of claim 1 wherein the lower alkanoic acid added is formic acid.

12. A process of claim 2 wherein the lower alkanoic acid added is formic acid.

13. A process of claim 6 wherein the lower alkanoic acid added is formic acid.

14. A process of claim 7 wherein the lower alkanoic acid added is formic acid.

15. A process of claim 8 wherein the lower alkanoic acid added is formic acid.

16. A process of claim 10 wherein the lower alkanoic acid added is formic acid.

17. A process of claim 11 wherein the reaction solvent is methyl t-butyl ether.

18. A process of claim 12 wherein the reaction solvent is methyl t-butyl ether.

19. A process of claim 13 wherein the reaction solvent is methyl t-butyl ether.

20. A process of claim 16 wherein the reaction solvent is methyl t-butyl ether.

* * * * *